United States Patent [19]

Negishi

[11] Patent Number: 4,548,472
[45] Date of Patent: Oct. 22, 1985

[54] PLATE FOR REMOVING SURFACE REFLECTION OUT OF THE VISUAL FIELDS

[76] Inventor: Masataka Negishi, 1000, Oaza Ryoke, Urawa-Shi, Saitama-Ken, Japan

[21] Appl. No.: 444,393

[22] PCT Filed: Apr. 5, 1982

[86] PCT No.: PCT/JP82/00103
§ 371 Date: Nov. 16, 1982
§ 102(e) Date: Nov. 16, 1982

[87] PCT Pub. No.: WO82/03465
PCT Pub. Date: Oct. 14, 1982

[30] Foreign Application Priority Data

Apr. 6, 1981 [JP] Japan .................................. 56-50625

[51] Int. Cl.$^4$ ................................................ G02B 3/08
[52] U.S. Cl. ................................ 350/276 R; 350/451
[58] Field of Search ................ 350/276 R, 451, 452

[56] References Cited

U.S. PATENT DOCUMENTS 2,887,566 5/1959 Marks .......................... 350/276 R

FOREIGN PATENT DOCUMENTS 0139250 10/1980 Japan .
56-133701 10/1981 Japan .

*Primary Examiner*—John K. Corbin
*Assistant Examiner*—Rebecca D. Gass
*Attorney, Agent, or Firm*—Wenderoth, Lind & Ponack

[57] ABSTRACT

This invention is a plate for removing surface reflection from visual fields. The glare removal plate is installed at the front face of an object such as a meter of a motor vehicle, a measuring instrument, or the like, a television picture screen surface, a show window, or a photograph to remove outside light out of the field of vision of a person viewing the object. Both the front face and the back face thereof having wave-like surfaces as though small prisms are connected successively. The invention is so adapted that, not only the above described removal of outside light out of visual fields occurs, but also it is difficult for coloration due to color separation and image shifting to occur.

9 Claims, 6 Drawing Figures

PLATE FOR REMOVING SURFACE REFLECTION OUT OF THE VISUAL FIELDS

BACKGROUND OF THE INVENTION

1. Field of the Invention

This invention relates to a plate for removing surface reflection from visual fields in order to prevent views of objects from becoming obscure as a consequence of outside light being projected onto and reflected from a surface of the object under visual observation thereof by a person through a glass plate or the like superposed over this surface.

2. Description of the Prior Art

There are instances wherein, when a meter of a motor vehicle or measuring instrument, a television screen surface, a show window, or a photograph, for example, is to be viewed, outside light is reflected from the surface thereof or is reflected from a glass plate or the like superposed over this surface and enters into the field of vision, whereby the view of the object becomes obscure.

As measures for eliminating such adverse effect of surface reflection, methods such as the method of reducing surface glare by applying multicoats on eye glasses and the method of converting the surface into a diffused surface have been adopted in the past, but the former, in addition to having little effectiveness, is expensive, while the latter has had a drawback in that an image which has been once made clear is made obscure.

As a means for eliminating such drawbacks, there is a plate for removing surface reflection from visual fields described in Japanese Patent Laid-Open Publication No. 133701/1981, which the inventor of the invention described in the present applicaion has previously proposed. This plate has a front face formed as a wave in which a large number of sloped surfaces inclined in the same direction and disposed in parallel arrangement, respectively have high edges in the direction of their thicknesses and low edges in the direction of the thickness of adjacent sloped surfaces. These edges are respectively joined by supplementary surfaces connected at an angle relative to the sloped surfaces. These edges also have a planar back face. Outside light is reflected by the sloped surfaces and the supplementary surfaces and is directed outside of the field of vision, whereby an object behind this plate designed for removal of glare outside of the view field can be viewed clearly. However, since this plate is one utilizing the principle of prisms, coloring due to light separation and image shifting occur, whereby the image is difficult to see.

This invention has as its object the provision of a plate for removing surface reflection out of the field of vision (hereinafter referred to a "glare removal plate") in which the difficult problems in the aforedescribed known plate are solved, removal out of the visual field of surface reflection of outside light is positively accomplished, and, moreover, generation of colors and shifting of the image do not occur.

SUMMARY OF THE INVENTION

This invention is one which is characterized by having a front face formed as a wave in which a large number of sloped surfaces are inclined in the same direction and are disposed in a parallel arrangement respectively. The surfaces have high edges in the direction of their thickness and low edges in the direction of the thickness of adjacent sloped surfaces. These edges are respectively joined by supplementary surfaces connected at a angle relative to the sloped surfaces. A back face is formed as wave in which sloped surfaces parallel in the direction of their thickness to the sloped surfaces of the front face and supplementary surfaces parallel to the supplementary surfaces of the front face are mutually joined.

DETAILED DESCRIPTION OF THE PREFERRED EMBODIMENT

Figure 1A:
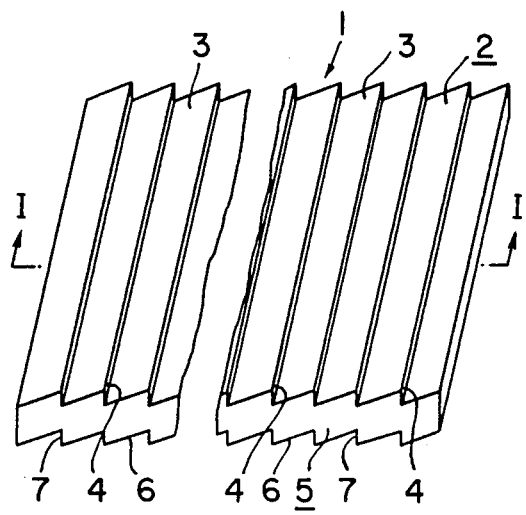
FIG. 1A is a perspective view, with a part omitted, showing a practical example of the glare removal plate according to this invention.
Figure 1B:
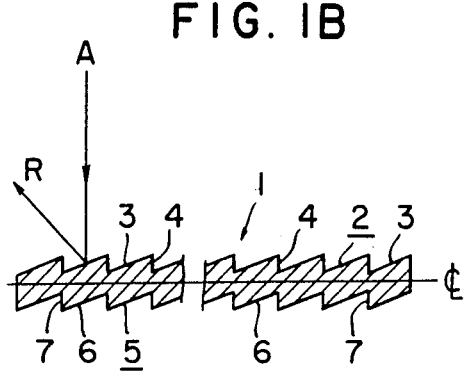
FIG. 1B is a cross-sectional view according to line I—I of FIG. 1A.

FIGS. 1A and 1B show a first example of practice of this invention, in which a glare removal plate 1 comprises a plastic such as silicone or acrylic or a transparent structure such as glass. The exterior shape of this glare removal plate 1 in the instant embodiment is substantially a square, but this shape is to be varied to match the shape of the object to be covered.

The front face 2 of the above mentioned glare removal plate 1 has a large number of sloped surfaces 3, 3, ... inclined in the same direction and disposed in parallel arrangement. The inclination angle of this sloped surface 3 has been so selected on the basis of geometrical-optical design that, when external light is reflected by this sloped surface 3, it reaches outside of the field of vision. Furthermore, the high edges in the direction of the thickness of these sloped surfaces 3 and the low edges in the direction of the thickness of the adjacent sloped surfaces 3 are respectively joined by supplementary surfaces 4 connected at an angle relative to these sloped surfaces 3. Therefore, the above mentioned front face 2, as a whole, is thereby formed as a wave-like surface.

The back face 5 of the aforementioned glare removal plate 1 has sloped surfaces 6 parallel to the sloped surfaces 3 of the aforedescribed front face 2 and supplementary surfaces 7 parallel to the supplementary surfaces 4 of the front face 2. These sloped surfaces 6 and supplementary surfaces 7 are mutually connected, whereby the back face 5, similarly as the aforedescribed front face 2, is formed, as a whole, as a wave-like surface. Also, because of the sloped surfaces 3 and 6 and the supplementary surfaces 4 and 7 of the front face 2 and the back face 5, the shape in cross section becomes that of a large number of parallelograms connected in succession as shown in FIG. 1B.

Figure 2:
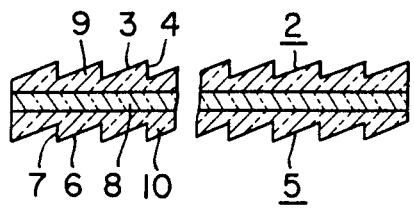

A glare removal plate 1 of this shape may be formed integrally by means of a press. Alternatively, it may be formed, as indicated in FIG. 2, by bonding plate structures 9 and 10 constituting the aforedescribed front face 2 and back face 5 respectively on the front and back faces of a flat plate 8.

Next, the function of the aforedescribed embodiment will be explained.

When the aforedescribed glare removal plate 1 is disposed in front of an object to be viewed such as a meter of a motor vehicle or a measuring instrument, the picture screen of a television receiver, a show window, a photograph, a clock, a framed picture, or the like, the direction of the glare removal plate 1 is selected after an estimate to a certain extent of the incidence direction of outside light. This outside light is reflected by the sloped surfaces 3 of the front face 2 of the glare removal plate 1 and is thereby removed out of the field of vision of a person viewing this object as indicated by the arrow R in FIG. 1B. Therefore, obstructive outside light does not affect the object, which can be clearly viewed.

Since the front face 2 and the back face 5 of the aforementioned glare removal plate 1 are both in the shape of prisms, there is the possibility of color separation occurring as a characteristic of prisms and of the object appearing in a colored state. However, because the sloped surfaces 3 and 6 of the front face 2 and the back face 5 of the glare removal plate 1 are disposed in mutually parallel arrangement, this glare removal plate 1, in a manner of speaking, is the same as flat plates in staggered arrangement. Therefore, for the same reason that, when an object is viewed through an ordinary window glass, it is not colored, when viewed through the glare removal plate 1 of this invention, the object is also not colored. Furthermore, as for the shifting of the object due similarly to a characteristic of prisms, since the sloped surfaces 3 and 6 of the front face 2 and the back face 5 are parallel, as described hereinbefore, the incident light rays entering the back face 5 of the glare removal plate 1 of the object and the light rays emitted out through the front face 3 of the glare removal plate 1 and entering the eyes of a viewer are parallel. Therefore, if the thickness of the glare removal plate 1 is made thin, almost no shifting of the image of the object will occur.

Figure 3:
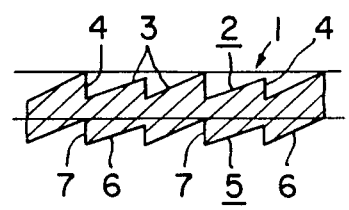
FIGS. 2, 3, and 4 are cross-sectional views respectively showing other embodiments of the invention.

While the high edges of the sloped surfaces 3 of the front face 2 of the glare removal plate 1 in the aforedescribed embodiment are disposed in the same plane, even when the positions of the high edges of the sloped surfaces are made different, as shown in FIG. 3, a similar functional effect is obtained. In this case, it is necessary to change the positions of the low edges of the sloped surfaces 6 of the back face 5 in accordance with the above mentioned variation state of the sloped surfaces 3.

Figure 4:
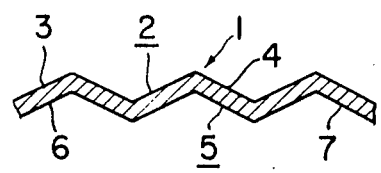

Furthermore, as shown in FIG. 4, the sloped surfaces 3 and 6 and the supplementary surfaces 4 and 7 of the front face 2 and the back face 5 may be made of the same length and, moreover, have equal inclination angles.

Figure 5:
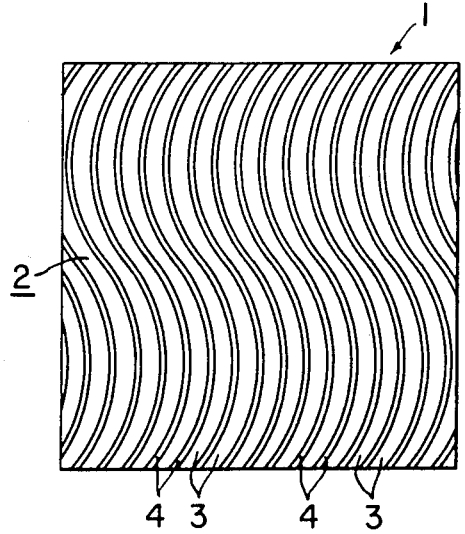
FIG. 5 is a plan view showing still another embodiment of the invention.

Still further, while, in the embodiments of FIGS. 1A and 1B, the sloped surfaces 3 and 6 and the supplement surfaces 4 and 7 are respectively of straightline form in their longitudinal directions. They also may be made in a nonlinear form such as an undulating form as shown in FIG. 5.

In addition, the glare removal plate 1 may be so made that it has a space formed therein, and water, air, or the like is sealed in this space.

As described above, by merely positioning the glare removal plate of this invention in front of an object, outside light can be removed out of the field of vision; moreover, colors are not generated; and image shifting can be kept small. Accordingly, the glare removal plate of this invention can be applied not only to the aforementioned meters of motor vehicles, measuring instruments, picture screens of television receivers, show windows, and photographs but also to liquid-crystal displays, electroluminescence, and the like.

I claim:

1. A plate for removing glare due to reflected rays from surfaces of objects, comprising:
    at least one transparent plate having a thickness, a central longitudinal axis through a cross-section of the thickness, a front face, and a back face;
    each of the front and back faces having a wave-like surface with a plurality of parallel sloped surfaces inclined in the same direction at an acute angle to the central longitudinal axis;
    each of the plurality of parallel sloped surfaces having a sharp high edge and a sharp low corner extending in a direction of the thickness of the plate;
    each of the front and back faces also having a plurality of parallel supplementary surfaces extending substantially perpendicularly to the central longitudinal axis of the plate in order to form the sharp low corner with an adjacent parallel sloped surface;
    said sloped surfaces on the front face and said sloped surfaces on the back face being in such parallel relationship that each high edge and each low corner on the front face extend along a single line perpendicular to the central longitudinal axis as a low corner and a high edge, respectively, on the back face;
    whereby a plurality of aligned parallelograms are formed by the pluralities of parallel sloped surfaces and parallel supplementary surfaces along the central longitudinal axis so that neither image coloring nor image shifting occurs and any image behind the plate can be seen clearly.

2. The plate according to claim 1, wherein any longitudinal cross-section of the plate has the plurality of aligned parallelograms connected along their short sides in succession.

3. The plate according to claim 1, wherein said plate is formed integrally from a plastic material.

4. The plate according to claim 1, wherein said plate is formed integrally from glass.

5. The plate according to claim 1, wherein said front face is formed on one side of the at least one transparent plate and said back face is formed on an opposite side of another transparent plate.

6. The plate according to claim 5, further comprising:
    a third transparent plate interposed between said at least one transparent plate and said another transparent plate.

7. The plate according to claim 5 further comprising:
    means, positioned between said at least one transparent plate and said another transparent plate, for forming a space between the front face and the back face.

8. The plate according to claim 1, wherein the sloped surfaces and the supplementary surfaces are disposed in a straight-line arrangement in their longitudinal directions.

9. The plate according to claim 1, wherein the sloped surfaces are disposed in a non linear arrangement in their longitudinal directions.

* * * * *